(12) United States Patent
Kesal et al.

(10) Patent No.: US 7,391,884 B2
(45) Date of Patent: Jun. 24, 2008

(54) CORRELATIVE ASSESSMENT BETWEEN SCANNED AND ORIGINAL DIGITAL IMAGES

(75) Inventors: Mustafa Kesal, Urbana, IL (US); M. Kivanc Mihcak, Redmond, WA (US); Gary K. Starkweather, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 10/714,581

(22) Filed: Nov. 14, 2003

(65) Prior Publication Data

US 2005/0105824 A1    May 19, 2005

(51) Int. Cl.
 *G06K 9/00* (2006.01)
(52) U.S. Cl. .................. 382/112; 382/140; 382/100
(58) Field of Classification Search .......... 382/100, 382/112, 140
See application file for complete search history.

(56) References Cited

U.S. PATENT DOCUMENTS

| | | | | |
|---|---|---|---|---|
| 4,853,778 | A * | 8/1989 | Tanaka | 348/422.1 |
| 5,920,842 | A * | 7/1999 | Cooper et al. | 704/503 |
| 6,606,409 | B2 * | 8/2003 | Warnick et al. | 382/173 |
| 6,636,635 | B2 * | 10/2003 | Matsugu | 382/218 |
| 7,136,191 | B2 * | 11/2006 | Kaltenbach et al. | 358/1.9 |
| 2002/0131068 | A1 * | 9/2002 | Ishii et al. | 358/1.14 |
| 2003/0215157 | A1 * | 11/2003 | Chao et al. | 382/294 |
| 2004/0125413 | A1 * | 7/2004 | Cordery | 358/3.28 |
| 2004/0174433 | A1 * | 9/2004 | Uchino | 348/207.99 |
| 2005/0281446 | A1 * | 12/2005 | Glukhovsky et al. | 382/128 |

* cited by examiner

*Primary Examiner*—Matthew C. Bella
*Assistant Examiner*—Randolph Chu
(74) *Attorney, Agent, or Firm*—Lee & Hayes, PLLC

(57) ABSTRACT

Exemplary methods for performing a statistical analysis of scanned images are disclosed. The methods described herein may be embodied as logic instructions on a computer-readable medium. In one exemplary implementation a correlation value is determined between a scanned image included in a digital file and an original digital image, and a signal is generated indicating whether the correlation value exceeds a threshold.

29 Claims, 7 Drawing Sheets

| | | | | | | | |
|---:|---:|---:|:-:|:-:|---:|---:|---:|
| 255 | 255 | 186 | . | . . . | 210 | 229 | 255 |
| 255 | 225 | 197 | . | . . . | 188 | 210 | 226 |
| 240 | 235 | 210 | . | . . . | 166 | 180 | 210 |
| 222 | 220 | 188 | . | . . . | 155 | 122 | 95 |
| 175 | 190 | 205 | . | . . . | 89 | 107 | 47 |
| 74 | 66 | 105 | . | . . . | 85 | 44 | 19 |
| 88 | 64 | 44 | . | . . . | 22 | 13 | 0 |
| 55 | 86 | 56 | . | . . . | 46 | 0 | 0 |
| 54 | 104 | 85 | . | . . . | 73 | 0 | 0 |
| 77 | 177 | 88 | . | . . . | 0 | 0 | 0 |
| 167 | 88 | 104 | . | . . . | 0 | 0 | 0 |

*Fig. 4a*

| | | | | | | | |
|---:|---:|---:|:-:|:-:|---:|---:|---:|
| 255 | 255 | 186 | . | . . . | 210 | 229 | 255 |
| 255 | 210 | 188 | . | . . . | 196 | 205 | 218 |
| 235 | 250 | 220 | . | . . . | 144 | 160 | 220 |
| 199 | 200 | 199 | . | . . . | 155 | 112 | 105 |
| 177 | 180 | 222 | . | . . . | 75 | 111 | 50 |
| 88 | 95 | 160 | . | . . . | 66 | 48 | 17 |
| 111 | 64 | 55 | . | . . . | 43 | 13 | 8 |
| 69 | 99 | 67 | . | . . . | 88 | 14 | 0 |
| 54 | 117 | 85 | . | . . . | 116 | 33 | 0 |
| 66 | 150 | 99 | . | . . . | 17 | 0 | 0 |
| 190 | 106 | 154 | . | . . . | 9 | 0 | 0 |

*Fig. 4b*

CORRELATIVE ASSESSMENT BETWEEN SCANNED AND ORIGINAL DIGITAL IMAGES

TECHNICAL FIELD

The described subject matter relates to electronic computing, and more particularly to a correlative assessment between scanned and original digital images.

BACKGROUND

Images such as photographs, pictures, logos, etc. may be created using digital rendering techniques, or using analog techniques which may be digitized. Digital images may be stored in a suitable storage medium such as, e.g., a hard disk drive, CD-ROM, etc., and may be transmitted across digital communication networks for viewing and/or printing at remote locations.

In certain applications, e.g., security and counterfeit detection, it may be desirable to distinguish between a printed copy of an original digital image and printed copy of a scanned copy of the original digital image or any other printed forgery copy of the original digital image.

SUMMARY

Implementations described and claimed herein address these and other issues by providing statistical approaches to distinguishing between a printed copy of an original digital image and printed copy of a scanned copy of the original digital image or any other printed forgery copy of the original digital image. The approaches may be used independently or in conjunction with one another. The statistical approaches may be implemented as instructions on one or more computer-readable media which, when executed by a computing device, configure the computing device as a special-purpose machine that distinguishes between a printed copy of an original digital image and printed copy of a scanned copy of the original digital image or any other printed forgery copy of the original digital image.

In one exemplary implementation, a method is provided. The method comprises determining a correlation value between the scanned image and an original digital image, wherein the scanned image is included in a digital file, and generating a signal indicating whether the correlation value exceeds a threshold.

In another exemplary implementation, a computer-readable medium having computer-executable instructions is provided. The instructions, when executed, direct a computer to compare properties of an original digital image to properties of a scanned image of the original digital image, and generate a signal if a correlation value between properties of the original digital image and properties of the scanned image exceeds a threshold.

In another exemplary implementation, a computer program product comprising logic instructions executable on a processor is provided. The logic instructions comprise a scaling module that scales at least one of a first image file and a second image file such that the files are of the same dimensions, and a correlation module that determines a correlation value between the first image file and the second image file, and generates a signal indicating whether the correlation value exceeds a threshold.

BRIEF DESCRIPTION OF THE DRAWINGS

FIGS. 4a-4b are matrices illustrating an exemplary original digital image and a scanned image of a printed copy of the original digital image;

DETAILED DESCRIPTION

Described herein are exemplary methods for distinguishing between a printed copy of an original digital image and printed copy of a scanned copy of the original digital image or any other printed forgery copy of the original digital image. The methods described herein may be embodied as logic instructions on a computer-readable medium. When executed on a processor, the logic instructions cause a general purpose computing device to be programmed as a special-purpose machine that implements the described methods.

Exemplary Computing System

Figure 1:
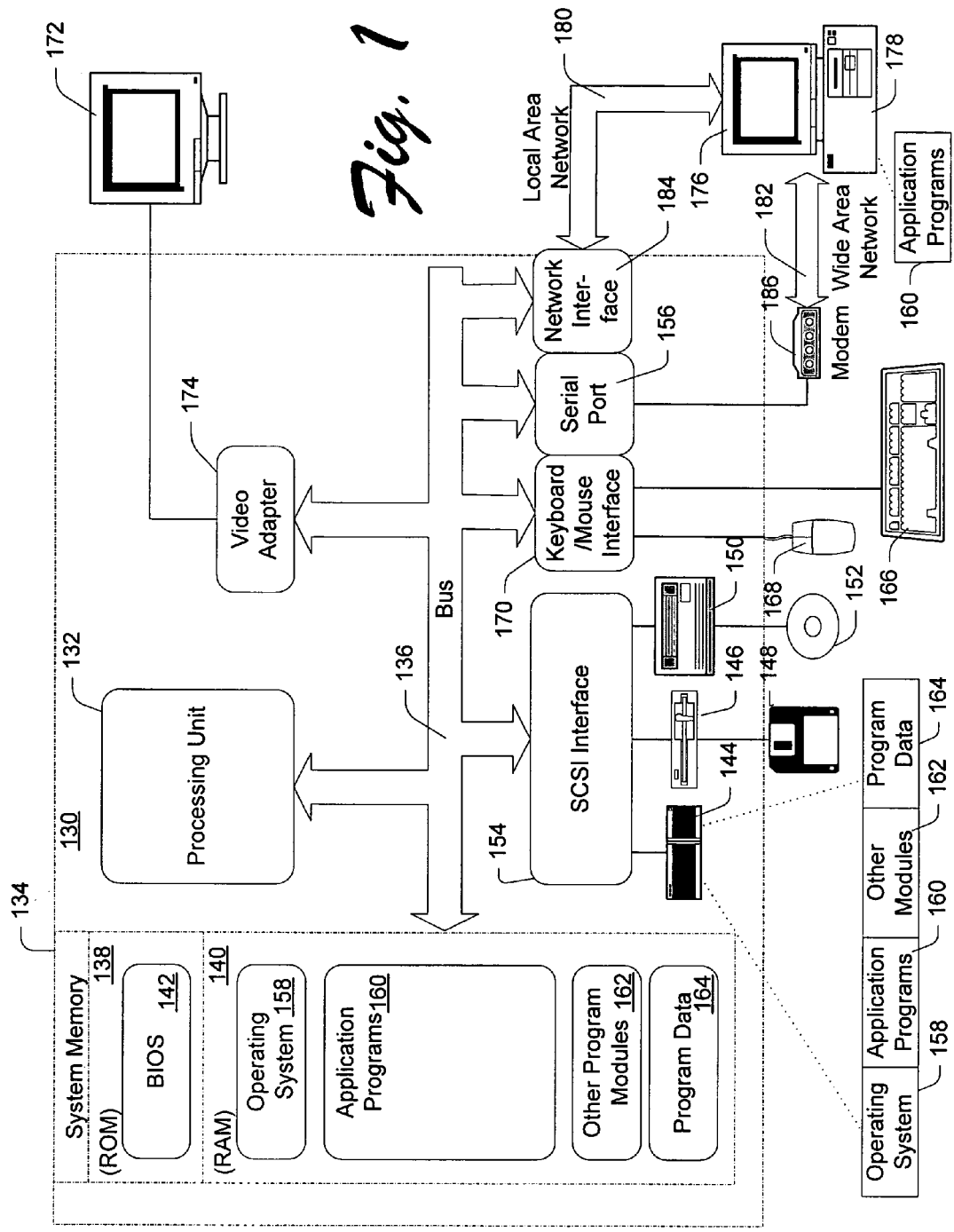
FIG. 1 is a schematic illustration of an exemplary computing device that can be utilized to implement one or more described embodiments.

FIG. 1 is a schematic illustration of an exemplary computing device 130 on which logic instructions embodying the methods described herein may be executed.

Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Exemplary Software Architecture

Figure 2:
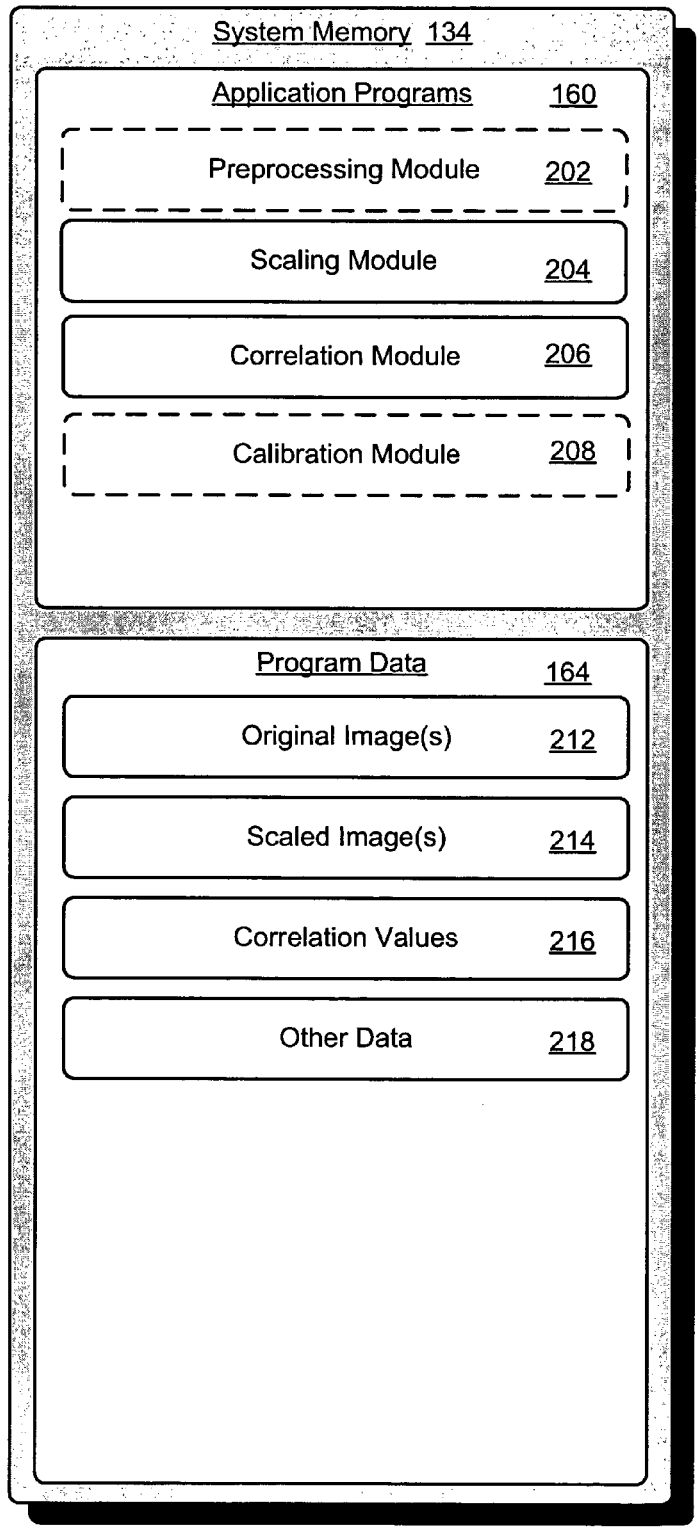
FIG. 2 is a schematic illustration of an exemplary software architecture for performing a statistical analysis of scanned images.

FIG. 2 is a block diagram that shows further exemplary aspects of system memory 134 of FIG. 1, including application programs 160 and program data 164 for performing a statistical analysis of scanned images. In this implementation, application programs 160 include, for example an optional preprocessing module 202, scaling module 204, correlation module 206, and an optional calibration module 208. Program data 164 includes original image(s) 212, scaled image(s) 214, correlation values 216, and other data 218. Aspects of these computer-program modules and their operations are now described in detail in reference to exemplary images of FIG. 3 through FIG. 6.

Exemplary Operations

Figure 3:
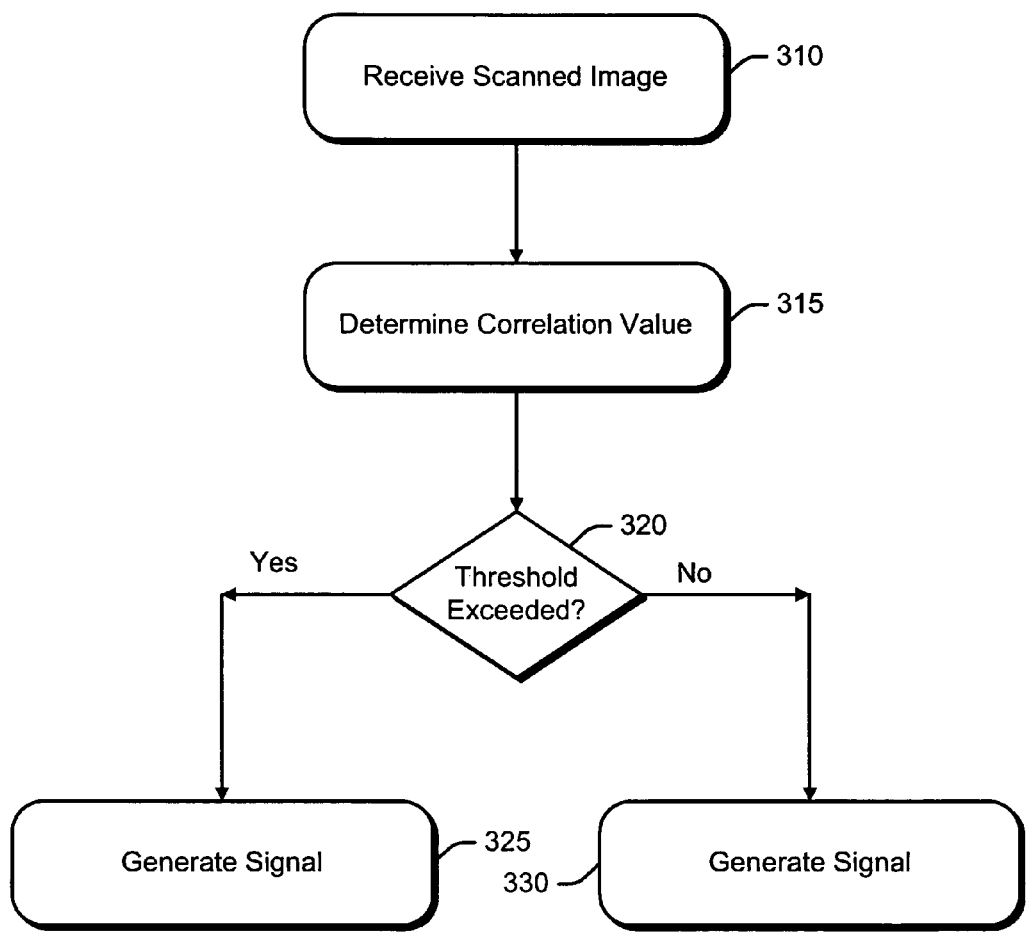
FIG. 3 is a flowchart illustrating operations in an exemplary procedure for performing a statistical analysis of scanned images.

FIG. 3 is a flowchart illustrating operations 300 in an exemplary correlation module 206 that performs a correlation analysis of scanned images. The operations 300 of correlation module 206 may be implemented as instructions on a computer-readable medium communicatively connected to a computing device such as, e.g., computing device 130. Referring to FIG. 3, at operation 310 a scanned image is received at the computing device 130. In an exemplary implementation the scanned image may be received from an external digital scanning device. Digital scanning devices are known in the art. Broadly, digital scanners scan a printed copy of an image and generate as output a digital file comprising the scanned image.

The digital file may formatted in accordance with one or more digital file formats (e.g., JPEG, GIF, PNG, BMP, etc.) and the scanned image may be in color, grayscale, or black-and-white (i.e., binary) format. One skilled in the art will recognize that digital image files may be stored as a matrix, wherein each entry in the matrix includes a value (or an array of values). Each entry in the matrix corresponds to an image pixel, and each value corresponds in the entry represents a parameter of the pixel. For example, a black-and-white format image of size (m×n) may be stored as a matrix of (m×n) binary values. Similarly, a grayscale image of size (m×n) may be stored as a matrix of (m×n) integer values ranging between a lower bound of the grayscale (e.g., 0) and an upper bound of the grayscale (e.g., 255). A color image of size (m×n) may be stored as a matrix of (m×n) arrays. Each array may comprise a numeric value indicating a color and one or more other entries indicating one more pixel properties (e.g., a standard digital color image consists of pixels, where each pixel is represented by three numeric values; namely red, green and blue components, each which are integers in {0, 1, 2, ..., 254, 255}).

FIGS. 4a-4b are matrices illustrating an exemplary original digital image (FIG. 4a) and a scanned image (FIG. 4b) of a printed copy of the original digital image. The images illustrated in FIGS. 4a-4b are in grayscale format, wherein each element of the (m×n) matrix comprises an integer entry between zero and 255, corresponding to a position on the grayscale. Neither the particular format nor the size of the images in FIG. 4a and FIG. 4b are critical.

In exemplary embodiments the scanned image may be received directly from a scanner, e.g., over a suitable communication link. In alternate embodiments the scanned image may be received from an optional pre-processing module 202 that compensates for rotation and translation errors introduced by the scanning procedure. An exemplary pre-processing module is disclosed in a co-pending and commonly assigned U.S. patent application entitled ESTIMATING ORIENTATION ANGLE AND TRANSLATION VALUES OF SCANNED IMAGES, assigned Ser. No. 10/719,690, the entire disclosure of which is incorporated by reference. The pre-processing module 202 may be implemented as instructions executable in the processing unit 132 of computing device 130, or may be implemented in a processor associated with the scanner.

In addition to pre-processing, the scanned image may need to be scaled such that its dimensions correspond to the dimensions of the original digital image. Typically, the printing and scanning process result in the scanned image being significantly larger than the original digital image. By way of illustration, assume the original digital image of FIG. 4a is dimensioned as an (m×n) matrix, which is printed to an image of size (k×l) inches. The printed image is scanned at a resolution of P dots per inch to generate a raw scanned image that has dimensions of (k·P×l·P). Hence, the raw scanned image may be reduced by a factor of (k·P/m) in the x dimension and (l·P/n) in the y dimension to reduce the scanned image to have dimensions of (m×n).

Figure 5:
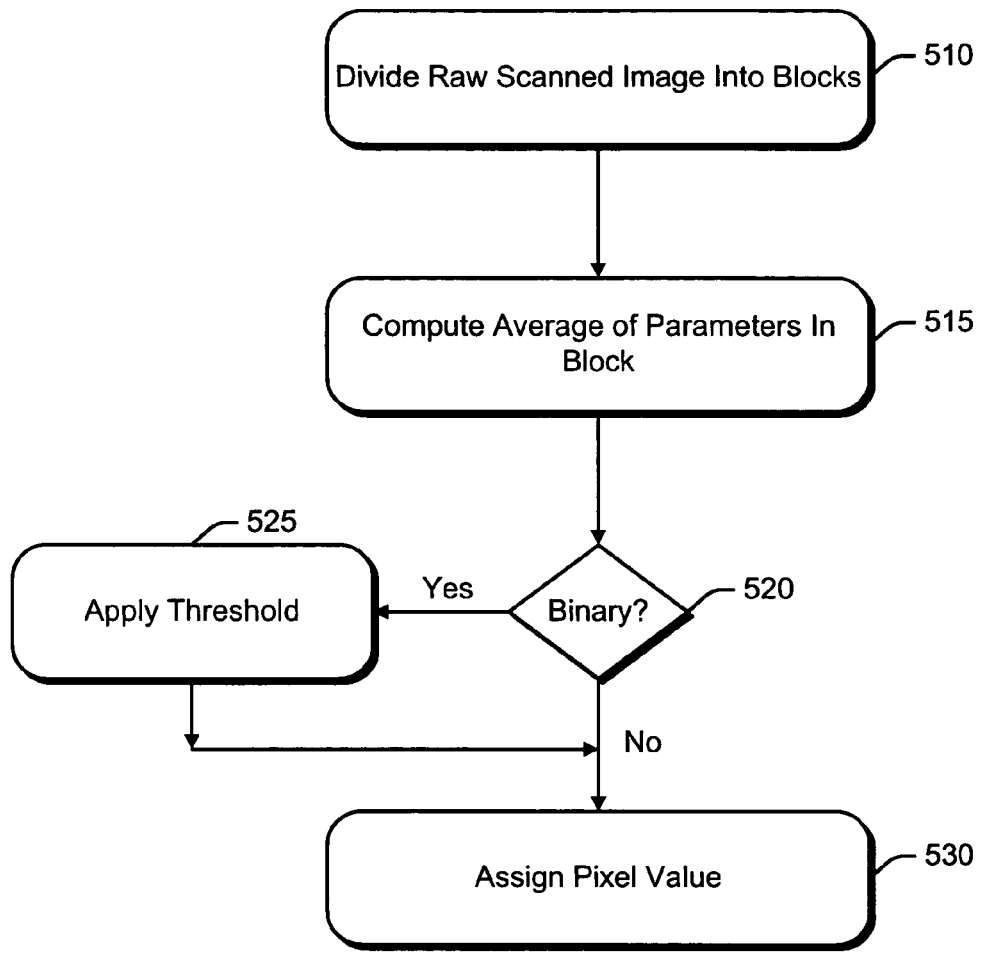
FIG. 5 is a flowchart illustrating operations in an exemplary process for scaling a raw, scanned image.

In an exemplary implementation the scaling process may be performed by computing an average value of the parameters in a region corresponding to a single pixel of the original image. FIG. 5 is a flowchart illustrating operations 500 implemented in an exemplary scaling module 204 for scaling a raw, scanned image. At operation 510, estimate(s) of the original image(s) 212 may be retrieved from the raw, scanned image. This process is called the scaling of the raw scanned image. The scaling process begins with dividing the raw scanned image into (m×n) blocks, each having dimensions (k·P/m) in the x dimension and (l·P/n) in the y dimension. It is assumed that the raw scanned image is binary, i.e., it consists of ones and zeros. If the scanner output consists of values in another range (e.g., a typical scanned output may consist of integer values in {0, 1, . . . , 254, 255}), then a suitable thresholding operation is initially performed on the scanner output to convert it to a binary image. Those, who are skilled in the art, would realize that this thresholding process may be application- and/or input-dependent (e.g., the threshold value may be a constant value of 127 for the abovementioned example, or the threshold value may vary depending on the varying contrast generated by scanner to the scanner output). For each block of the raw scanned image, the following operation is performed: The empirical mean of the pixel value parameters of the raw scanned image in that block is computed, then scaled by 255 and rounded to the nearest integer. This yields the average pixel value parameter of the estimate of the original image that corresponds to that block (operation 515).

If, at operation 520, the file format is not binary (i.e., the file format is either grayscale or color), then the average pixel value parameter for the block (found as a result of operation 515) may be assigned to the corresponding pixel in the scaled image (operation 530). Applying the notation R(x,y) to refer to the (x,y) entries in the matrix corresponding to the raw, scanned image and S(x,y) to refer to the entries in the matrix corresponding to the scanned image, the average value of the R(x,y) pixels in a block are assigned to the corresponding S(x,y) pixel. By contrast, if at operation 520, the pixel parameters are in a binary format, then a threshold value is applied to determine whether the corresponding S(x,y) pixel should be assigned a binary zero or a binary one. For example, if the average value of the R(x,y) pixels in a block exceed a threshold of 127, then the corresponding S(x,y) pixel should be assigned a binary one. By contrast, if the average value of the R(x,y) pixels in a block is less than a threshold of 127, then the corresponding S(x,y) pixel should be assigned a binary zero.

The operations 515 through 530 are repeated for each of the blocks in the raw, scanned image, resulting in a matrix S having dimensions of (m×n). The matrix S may be stored in memory 134 as a scaled image 214. In subsequent operations, the scaled image 214 may be compared directly to the original digital image matrix. In an alternate implementation, scaling module 204 may scale both images such that the scaled images have the same dimension.

Referring again to FIG. 3, at operation 315 a correlation value between the scanned image received in operation 310 (or the scaled version of the image) and the corresponding original digital image is determined. The corresponding original digital image may be stored locally, e.g., as other data 226 in the memory 134 or, e.g., on disk memory 152 of computing device 130. Alternatively, the corresponding original digital image may be stored remotely, e.g., in a remote memory location communicatively connected to the computing device, and may be transmitted to the computing device 130 over a suitable communication link.

In one exemplary implementation, determining a correlation value comprises performing a pixel-by-pixel comparison of a property of the original image with a corresponding property of the scanned image. One technique comprises computing the variance $\sigma^2$ (or the standard deviation $\sigma$), between values representing the property in the original digital image and corresponding values in the scanned image. Applying the notation D(x, y) to refer to the entries in the matrix corresponding to the original digital image and S(x, y) to refer to the entries in the matrix corresponding to the scanned image, the variance $\sigma^2$ (an $n^{th}$ order statistic) may be determined using the following equation:

$$\sigma^2 = \sum_{x=1}^{m} \sum_{y=1}^{n} (D(x, y) - S(x, y))^2 \quad \text{Equation (1)}$$

Here, we assume that the empirical means of both the original digital image D and the scanned image S is zero. Equivalently, we assume that prior to computing the variance via Equation (1), we subtract the empirical mean of D (resp. the empirical mean of S) from each D(x,y) (resp. from each S(x,y)) to make them zero-mean.

Figure 6:
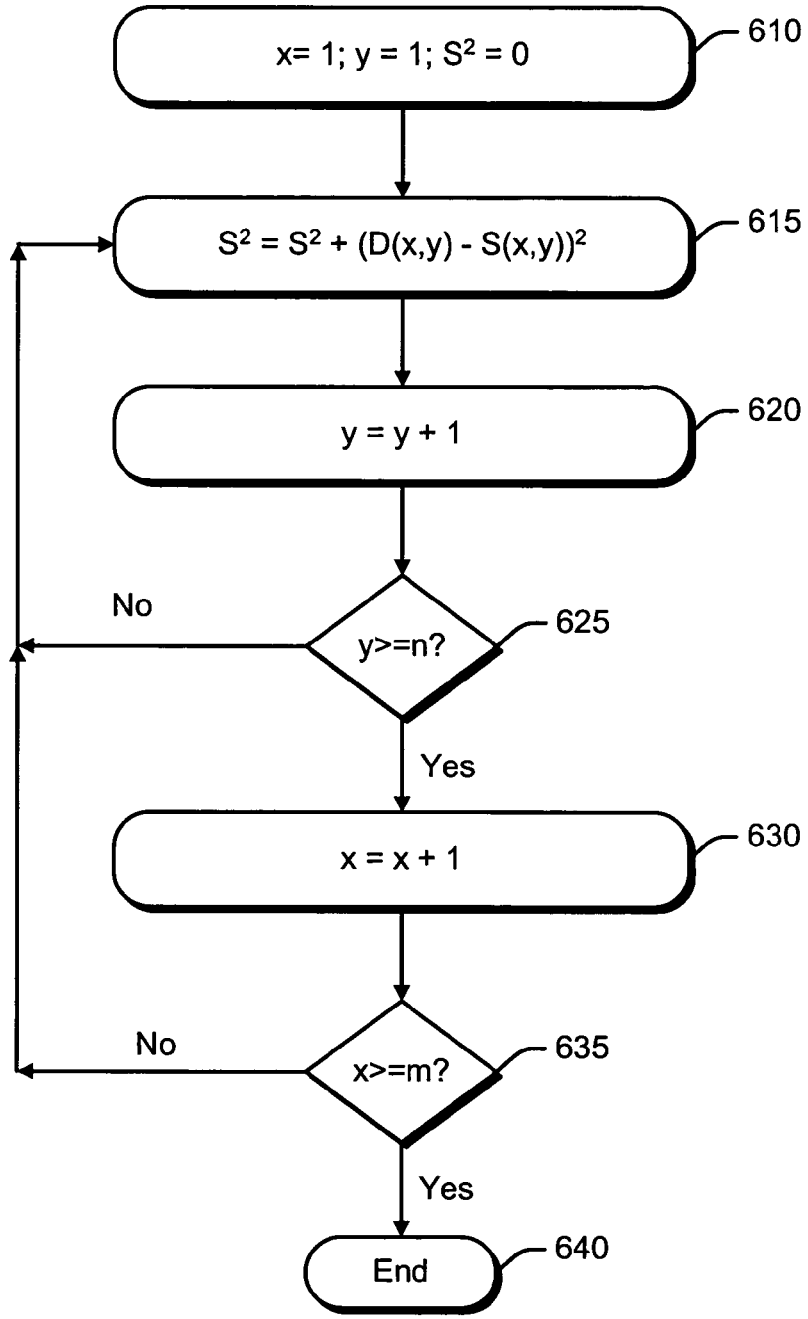
FIG. 6 is a flowchart illustrating exemplary operations for computing the variance deviation between a first digital image matrix and a second digital image matrix.

FIG. 6 is a flowchart illustrating exemplary operations 600 for implementing Equation (1) to compute the variance between a first digital image matrix and a second digital image matrix. At operation 610, counters x and y are set to 1, and the value of $\sigma^2$ is set to zero. At operation 615, S(x,y) is subtracted from D(x,y) and the difference is squared and assigned to $\sigma^2$. At operation 620 y is incremented and if, at operation 625, y is less than n, then control passes back to operation 615 and S(x,y) is subtracted from D(x,y) and the difference squared and added to $\sigma^2$.

If, at operation 625, y is greater than or equal to n, then control passes to operation 630 and x is incremented. If at operation 635, x is less than m, then control passes back to operation 615 and S(x,y) is subtracted from D(x,y) and the difference squared and added to $\sigma^2$. By contrast, if, at operation 635, x is greater than or equal to m, then control passes to 640, and the operation ends. The nested loop operations 615-635 compute the variance $\sigma^2$ between the matrix S(x,y) that represents the scanned image and the matrix D(x,y) that represents the original digital image. The variance $\sigma^2$ may be stored as a correlation value 216 in memory 134. One skilled in the art will recognize that the standard deviation or a higher-order difference may be used in place of the standard deviation.

In another exemplary implementation, determining a correlation value comprises computing a cross-product between values representing the property in the original digital image and corresponding values in the scanned image. Again, applying the notation D(x,y) to refer to the entries in the matrix corresponding to the original digital image and S(x,y) to refer to the entries in the matrix corresponding to the scanned image, the cross-product of the matrices D and S may be calculated as a correlation value. If the images are in binary or grayscale format, then the matrices D and S typically have only a single value each element, so the cross-product may be calculated in a conventional manner. If the images are in color, then the matrices D and S typically have an array of values in each entry, so care must be taken to calculate the cross product using corresponding values from the arrays. Routines for computing cross-products are well known in the art.

Referring again to FIG. 3, at operation 320 it is determined whether the correlation value determined in operation 315 exceeds a threshold, and if so, then a signal is generated indicating that the threshold was exceeded (operation 325). By contrast, if the correlation value does not exceed a threshold, then a signal is generated indicating that the threshold was not exceeded (operation 330).

Operation 320 may be implemented by comparing the correlation value determined in operation 315 with a threshold value. The nature of the comparison and the threshold value may differ as a function of the correlation value. By way of example, if the correlation value determined in operation 315 measures the variance (or standard deviation) of the differences between the original digital image and the scanned image, then the variance may be compared to an absolute threshold or to a threshold based on the differences. If the variance (or standard deviation) exceeds the threshold, then control passes to operation 325.

If the correlation value determined in operation 315 is a cross-product of the matrices D and S, then the threshold may be fixed, or may be a set to a percentage of a maximum correlation. In one implementation, the maximum correlation may be determined by taking the cross-product of the matrix D with itself. If the cross-product of the matrix D with the matrix S exceeds a threshold percentage of the cross-product of D with itself, then control passes to operation 325. The threshold percentage may be a fixed percentage, or may be a variable parameter. Increasing the threshold percentage results in a more stringent test for distinguishing between a printed copy of an original digital image and printed copy of a scanned copy of the original digital image. The threshold constitutes a tradeoff between probability of false positives and probability of miss. Here, the probability of false positive represents the probability of declaring the scanned image as authentic even though this was not the case (i.e., the scanned image was a forgery). Conversely, probability of miss represents the probability of declaring the scanned image as a forgery even though this was not the case (i.e., the scanned image was indeed authentic).

The signals generated at operations 325 and 330 may be written to a memory log, presented on a suitable user interface, and/or input to another process executing on a computing device. For example, in a counterfeit detection application, a signal indicating that a threshold has been exceeded may cause a computing device 130 to display a visual and/or audible indication that the scanned image may be a counterfeit, and may cause the computing device to invoke further counterfeit detection operations. A specific visual indication of the differences between an digital image and that of a scanned image of the original digital image comprise instructions that, when executed direct the computer to compute a histogram representing differences in a property of the original digital image the scanned image.

The printing process and the scanning process may introduce discrepancies between the original digital image and a scanned image of a printed copy of the original digital image. Optionally, a calibration module 208 may implement a process to produce a calibration correlation value (or a set of values) that represents a correlation value between the original digital image and a scanned image of a printed copy of the original digital image. The calibration correlation value may be used in the correlation process.

Figure 7:
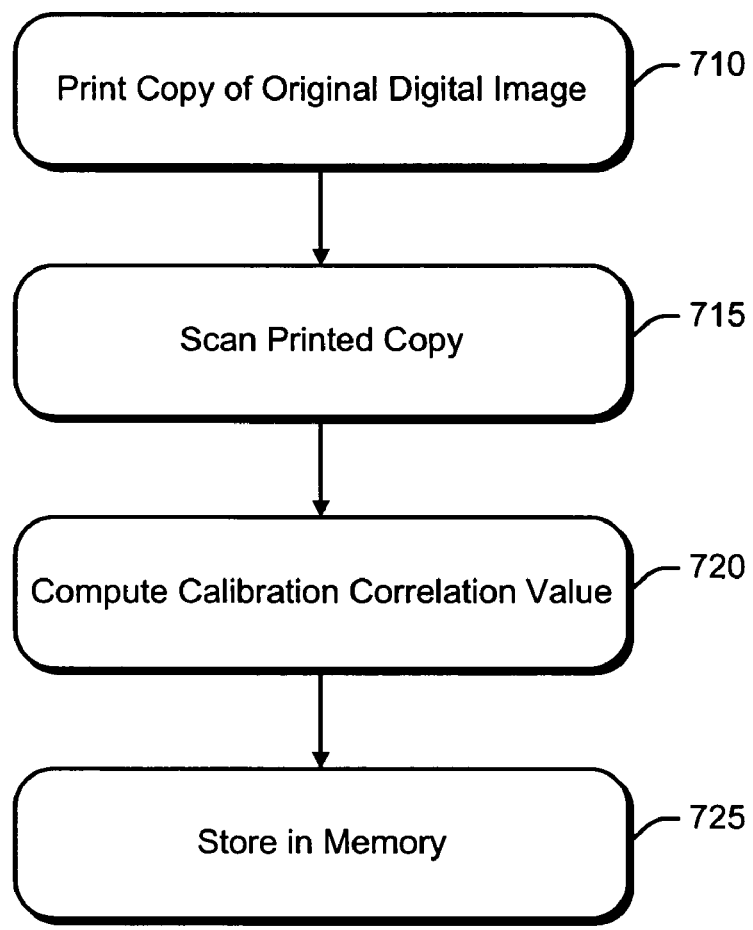
FIG. 7 is a flowchart illustrating exemplary operations for calculating a calibration correlation value.

FIG. 7 is a flowchart illustrating exemplary operations for calculating a calibration correlation value. At operation 710 a copy of the original digital image is printed. At operation 715 the printed copy is scanned. At operation 720 a calibration correlation value between the scanned image and the original digital image is computed. The calibration correlation value may be computed using the techniques described above. At operation 725 the calibration correlation value is stored in memory, e.g., as other data 218. In one alternate embodiment, operation 715-720 may be repeated multiple times and an average calibration correlation value may be stored in memory. In another alternate embodiment, operations 715-720 may be repeated using different printer and scanner combinations, and stored in a memory location that associates a particular printer model and scanner model with a calibration correlation value.

The calibration correlation value may be used by the correlation module 206 during the correlation process. In one implementation, the calibration correlation value is subtracted from the correlation value computed in operation 315 before a threshold is applied at operation 320.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method, comprising:
    calculating a calibration correlation value to compensate for an error introduced by a scanning process implemented to produce a scanned image;
    compare properties of an original digital image, the original digital image being defined by a matrix having dimensions m×n to properties of a scanned image of the original digital image, the scanned image of the original digital image being defined as a matrix having dimensions k×l, to produce a correlation value, wherein during the comparison of the original digital image and the scanned image of the of the original digital image the scanned image is scaled to match dimensions with the original digital image by;
        dividing the scanned image of the original digital image into m×n blocks, each block having dimensions k·P/m in the x dimension and l·P/n in the y dimension, wherein P is a resolution of dots per inch by which the second image was scanned at;
        summing and averaging pixel value parameters associated with each pixel in each block respectively; and
    determining the correlation value between the scanned image and an original digital image, wherein the scanned image is included in a digital file;
    subtracting the calibration correlation value from the correlation value to produce a difference; and
    generating a signal indicating whether the difference exceeds a threshold.

2. The method of claim 1, wherein determining a correlation value between the scanned image and an original digital image comprises performing a pixel-by-pixel comparison of a property of the original digital image and the scanned image.

3. The method of claim 1, wherein determining a correlation value between the scanned image and an original digital image comprises computing a cross-product of the original digital image the scanned image.

4. The method of claim 1, wherein determining a correlation value between the scanned image and an original digital image comprises calculating the variance between a property of corresponding pixels in the original digital image and the scanned image.

5. The method of claim 4, wherein determining a correlation value between the scanned image and an original digital image comprises calculating a higher-order difference between a property of corresponding pixels in the original digital image and the scanned image.

6. The method of claim 1, wherein determining a correlation value between the scanned image and an original digital image comprises computing the sum of the pixel-by-pixel multiplication of a property of corresponding pixels in the original digital image and in the scanned image.

7. The method of claim 1, wherein generating a signal if the difference exceeds a threshold comprises comparing a computed correlation value to a predetermined threshold.

8. The method of claim 7, wherein comparing a computed correlation value to a predetermined threshold comprises comparing an $n^{th}$ order statistic between a property of corresponding pixels in the original digital image and the scanned image to a predetermined variance parameter.

9. The method of claim 8, wherein the property comprises a grayscale value of a pixel.

10. The method of claim 8, wherein the property comprises a value indicating a color of a pixel.

11. The method of claim 7, wherein comparing a computed correlation value to a predetermined threshold comprises comparing the sum of the pixel-by-pixel multiplication of a property of corresponding pixels in the original digital image and the scanned image to the sum of the square of the original digital image.

12. The method of claim 11, wherein the property comprises a grayscale value of a pixel.

13. The method of claim 11, wherein the property comprises a value indicating a color of a pixel.

14. A computer-readable medium comprising logic instructions that, when executed on a processor, cause a computing device to implement the method of claim 1.

15. A computer-readable medium having computer-executable instructions that, when executed, direct a computer to:
   calibrate a calibration correlation value to compensate for an error introduced by a scanning process implemented to produce a scanned image;
   compare properties of an original digital image, the original digital image being defined by a matrix having dimensions m×n to properties of a scanned image of the original digital image, the scanned image of the original digital image being defined as a matrix having dimensions k×l, to produce a correlation value, wherein during the comparison of the original digital image and the scanned image of the of the original digital image the scanned image is scaled to match dimensions with the original digital image by;
   dividing the scanned image of the original digital image into m×n blocks, each block having dimensions k·P/m in the x dimension and l·P/n in the y dimension, wherein P is a resolution of dots per inch by which the second image was scanned at;
   summing and averaging pixel value parameters associated with each pixel in each block respectively; and
   subtract the calibration correlation value from the correlation value to calculate a difference; and
   generate a signal if the difference exceeds a threshold.

16. The computer-readable medium of claim 15, wherein the computer-executable instructions that, when executed, direct a computer to compare properties of an original digital image to properties of a scanned image of the original digital image comprise instructions that, when executed, direct a computer to perform a pixel-by-pixel comparison of a property of the original digital image and the scanned image.

17. The computer-readable medium of claim 15, wherein the computer-executable instructions that, when executed, direct a computer to compare properties of an original digital image to properties of a scanned image of the original digital image comprise instructions that, when executed, direct a computer to compute a histogram representing differences in a property of the original digital image the scanned image.

18. The computer-readable medium of claim 15, wherein the computer-executable instructions that, when executed, direct a computer to compare properties of an original digital image to properties of a scanned image of the original digital image comprise instructions that, when executed, direct a computer to calculate an $n^{th}$-order statistic between a property of corresponding pixels in the original digital image and the scanned image.

19. The computer-readable medium of claim 15, wherein the computer-executable instructions that, when executed, direct a computer to compare properties of an original digital image to properties of a scanned image of the original digital image comprise instructions that, when executed, direct a computer to compute the sum of the pixel-by-pixel multiplication of a property of corresponding pixels in the original digital image and the scanned image.

20. The computer-readable medium of claim 15, wherein the computer-executable instructions that, when executed, direct a computer to generate a signal if a correlation value between properties of the original digital image and properties of the scanned image exceeds a threshold comprise instructions that, when executed, direct a computer to compare an $n^{th}$ order statistic between a property of corresponding pixels in the original digital image and the scanned image to a predetermined variance parameter.

21. The computer-readable medium of claim 20, wherein the property comprises a grayscale value of a pixel.

22. The computer-readable medium of claim 20, wherein the property comprises a value indicating a color of a pixel.

23. The computer-readable medium of claim 15, wherein the computer-executable instructions that, when executed, direct a computer to generate a signal if a correlation value between properties of the original digital image and properties of the scanned image exceeds a threshold comprise instructions that, when executed, direct a computer to compare the sum of the pixel-by-pixel multiplication of a property of corresponding pixels in the original digital image and the scanned image to a the sum of the square a property of the original digital image.

24. The computer-readable medium of claim 23, wherein the property comprises a grayscale value of a pixel.

25. The computer-readable medium of claim 23, wherein the property comprises a value indicating a color of a pixel.

26. A computer-readable medium encoded with logic instructions executable on a processor, wherein the logic instructions comprise:
- a calibration module that calculates a calibration correlation value to compensate for an error introduced by a scanning process implemented to produce a scanned image;
- a scaling module that scales a first image file, the first image file being a matrix having dimensions m×n, and a second image file, the second image file being a matrix having dimensions k×l, the second image file being generated by the scanning process such that the files are of the same dimensions, wherein the second image file is scaled to match the dimensions of the first image by:
  - dividing the second image into m×n blocks, each block having dimensions k·P/m in the x dimension and l·P/n in the y dimension, wherein P is a resolution of dots per inch by which the second image was scanned at;
  - summing and averaging pixel value parameters associated with each pixel in each block respectively; and
- a correlation module that determines a correlation value between the first image file and the second image file and subtracts the calibration correlation value from the correlation value to calculate a difference, and generates a signal indicating whether the difference exceeds a threshold.

27. The computer-readable medium of claim 26, wherein the scaling module comprises logic instructions that instruct a processor to:
- apply a threshold to the average of the parameter values in the plurality of blocks.

28. The computer-readable medium of claim 26, wherein the correlation module comprises logic instructions that instruct a processor to compute a variance between the first image file and the second image file.

29. The computer-readable medium of claim 26, wherein the correlation module comprises logic instructions that instruct a processor to compute a cross-product of the first image file and the second image file.

* * * * *